US012800503B2

(12) United States Patent
Tao

(10) Patent No.: US 12,800,503 B2
(45) Date of Patent: Nov. 17, 2026

(54) MICROSCOPIC RAMAN SPECTROSCOPIC DEVICE, AND ANGLE ADJUSTING MEMBER FOR OPTICAL ELEMENT

(71) Applicant: SHIMADZU CORPORATION, Kyoto (JP)

(72) Inventor: Tomoyo Tao, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 312 days.

(21) Appl. No.: 18/690,778

(22) PCT Filed: Mar. 3, 2022

(86) PCT No.: PCT/JP2022/009154
§ 371 (c)(1),
(2) Date: Nov. 6, 2024

(87) PCT Pub. No.: WO2023/037587
PCT Pub. Date: Mar. 16, 2023

(65) Prior Publication Data

US 2025/0277741 A1 Sep. 4, 2025

(30) Foreign Application Priority Data

Sep. 13, 2021 (JP) ................................ 2021-148807

(51) Int. Cl.
*G01N 21/65* (2006.01)

(52) U.S. Cl.
CPC ... *G01N 21/65* (2013.01); *G01N 2201/06113* (2013.01); *G01N 2201/066* (2013.01)

(58) Field of Classification Search
CPC ......... G01N 21/65; G01N 2201/06113; G01N 2201/066
See application file for complete search history.

(56) References Cited

U.S. PATENT DOCUMENTS

| | | | | |
|---|---|---|---|---|
| 5,090,797 A * | 2/1992 | Cleveland | A61B 3/113 359/872 |
| 2012/0314269 A1 | 12/2012 | Takano et al. | |
| 2017/0045722 A1* | 2/2017 | Fretel | G02B 21/0076 |

FOREIGN PATENT DOCUMENTS

| | | |
|---|---|---|
| JP | H02-96935 A | 4/1990 |
| JP | 7-251277 A | 10/1995 |

(Continued)

OTHER PUBLICATIONS

International Search Report for corresponding Application No. PCT/JP2022/009154, mailed Apr. 26, 2022.

(Continued)

*Primary Examiner* — Jamil Ahmed
(74) *Attorney, Agent, or Firm* — Renner, Otto, Boisselle & Sklar, LLP

(57) ABSTRACT

Provided is an angle adjustment member for an optical element, the angle adjustment member including: two actuators; and a center bar of which a tip portion is movable in 360°. Furthermore, in order to provide a micro-Raman spectroscopic device capable of performing adjustment of an optical axis without opening a device housing and capable of further performing fine adjustment of the optical axis with out imposing an excessive burden on an adjuster, at least one of an incident light optical element and a Raman light optical element has the angle adjustment member.

12 Claims, 8 Drawing Sheets

(56) References Cited

FOREIGN PATENT DOCUMENTS

| | | | | | |
|---|---|---|---|---|---|
| JP | 2003002118 | A | | 1/2003 | |
| JP | 2006113021 | A | * | 4/2006 | ............. G01N 21/65 |
| JP | 2006214899 | A | * | 8/2006 | ............. G01N 21/65 |
| JP | 2011-172331 | A | | 9/2011 | |
| JP | 2013241787 | A | | 12/2013 | |
| JP | 2017-519235 | A | | 7/2017 | |
| JP | 2018-113134 | A | | 7/2018 | |
| WO | 2013/017953 | A2 | | 2/2013 | |

OTHER PUBLICATIONS

Written Opinion for corresponding Application No. PCT/JP2022/009154, mailed Apr. 26, 2022.
Office Action in corresponding Japanese Patent Application No. JP2023-546743 dated Jan. 21, 2025, with English machine translation.
Extended European Search Report for corresponding EP Application No. 22866922.2 dated Aug. 19, 2025.

* cited by examiner

[Fig. 1]
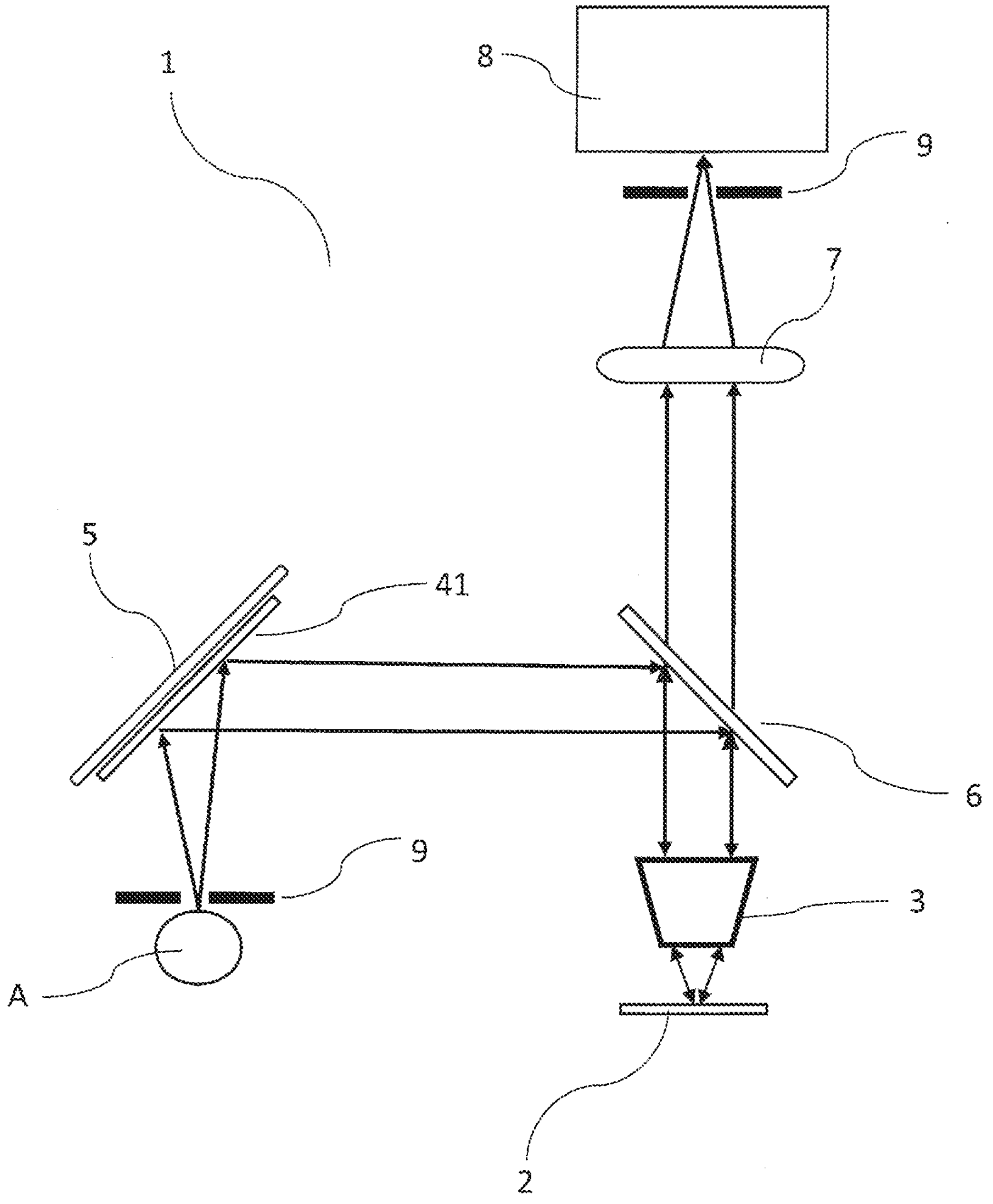

[Fig. 2]
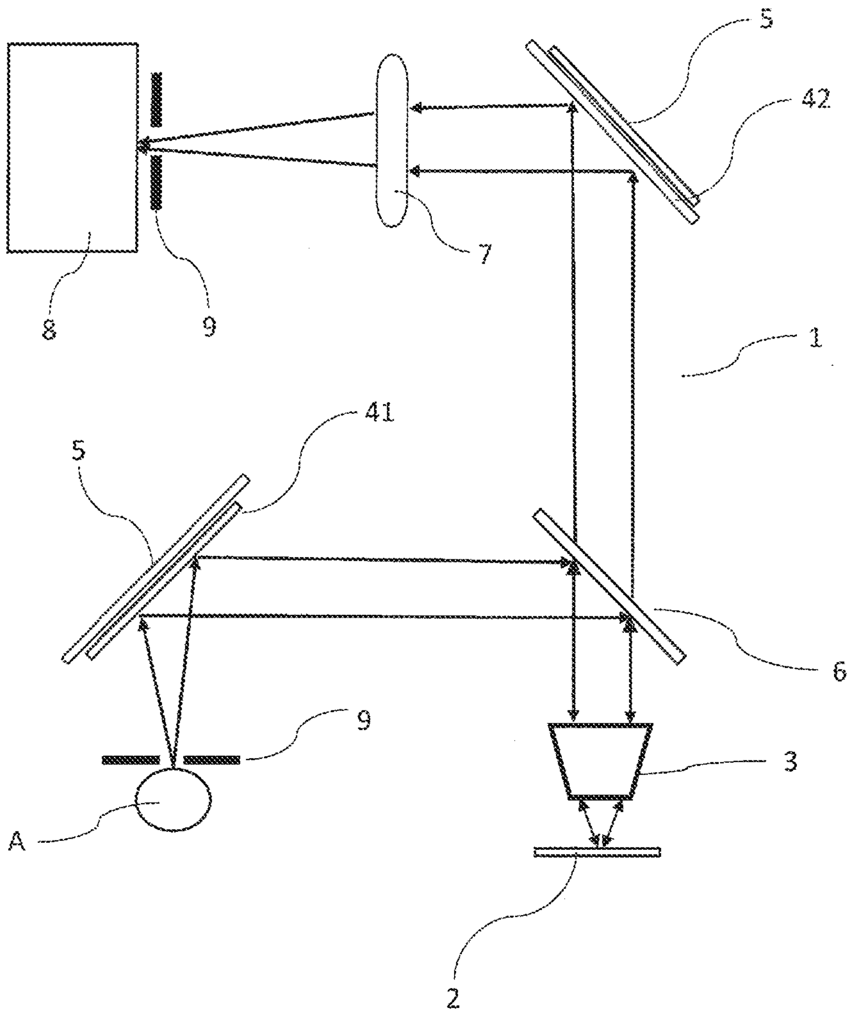

[Fig. 3]
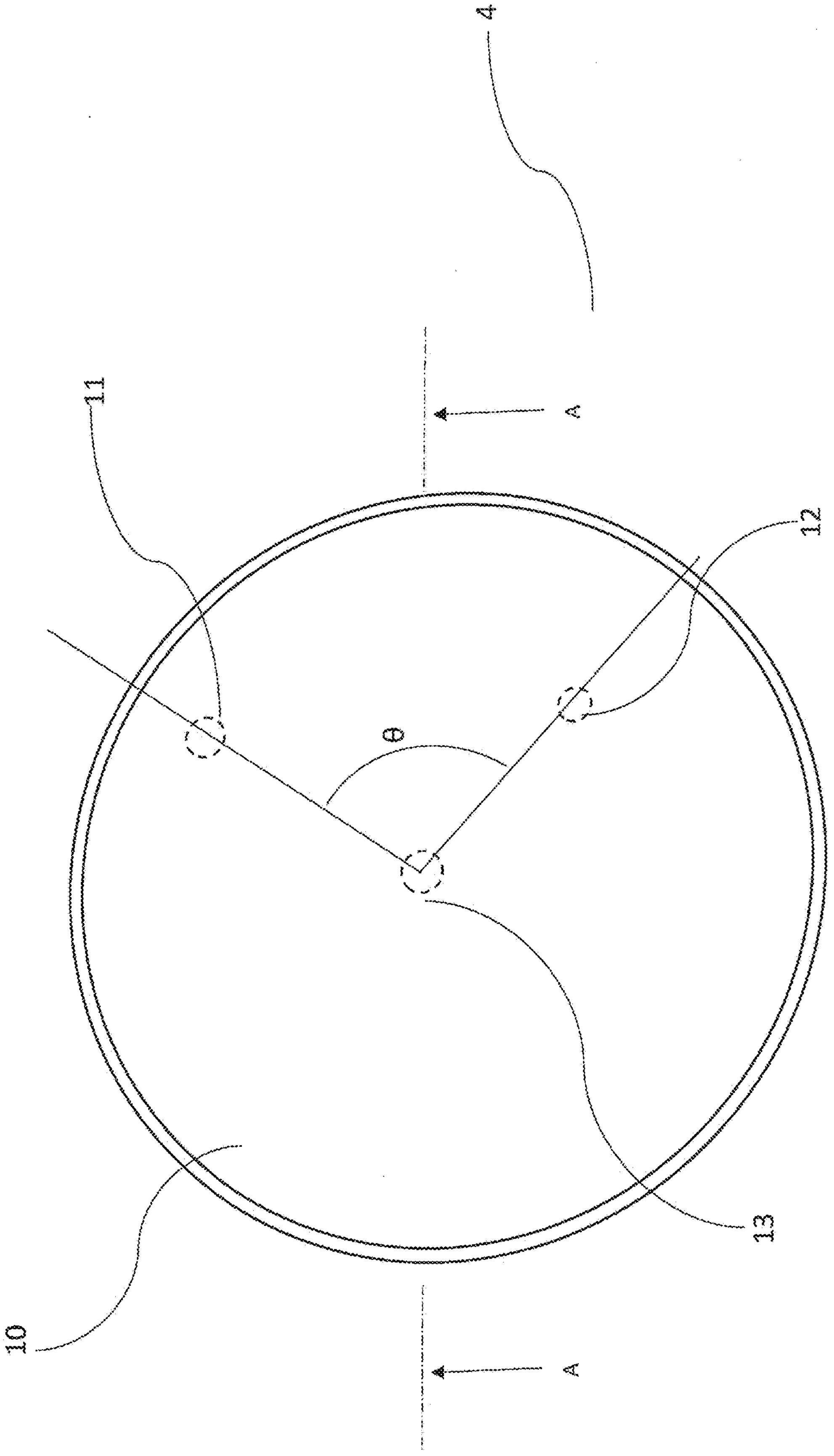

[Fig. 4]
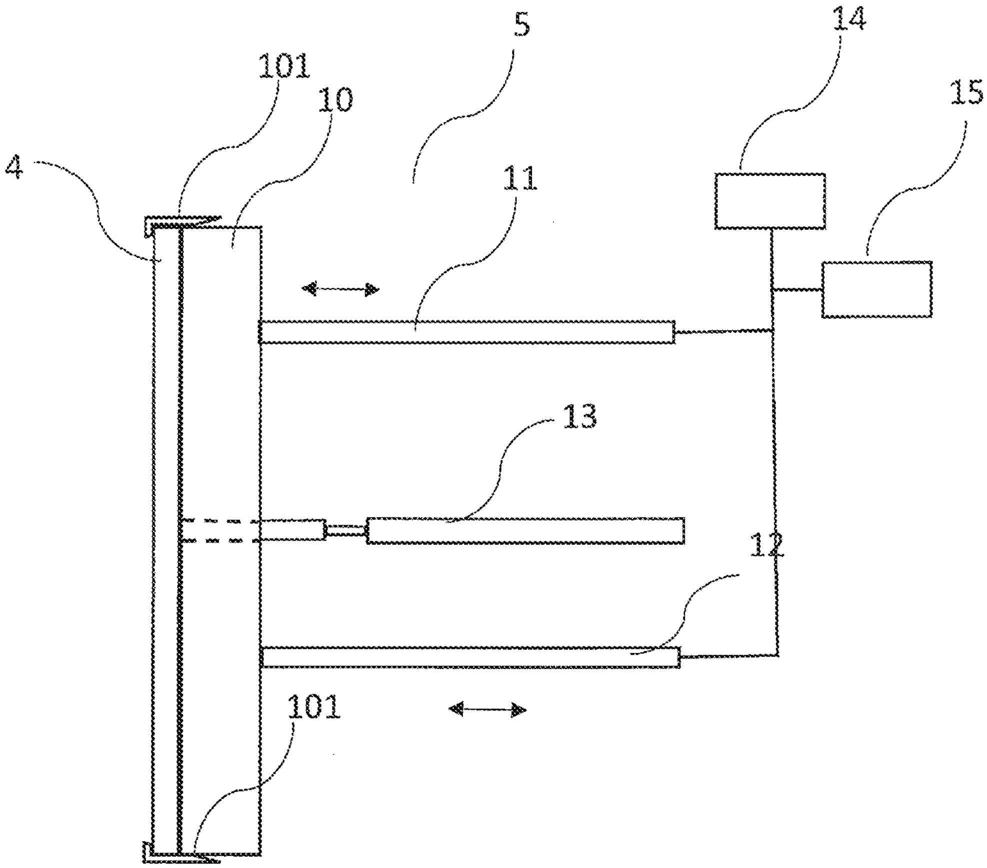

[Fig. 5]
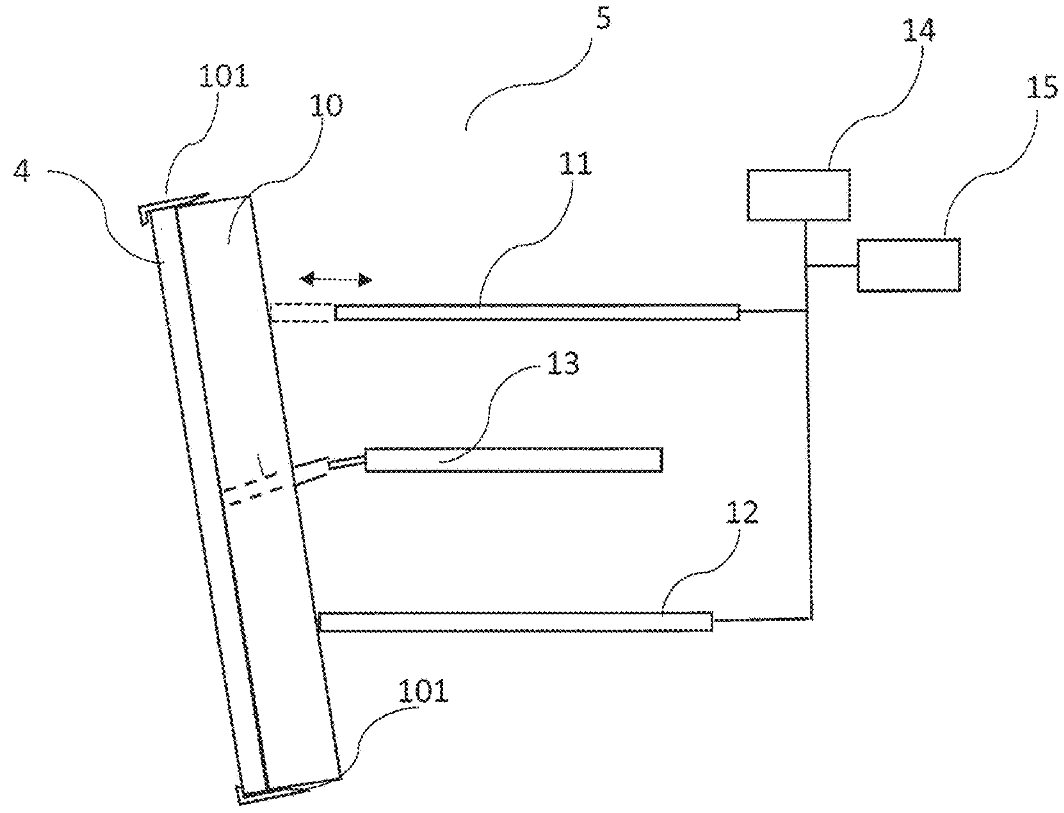

[Fig. 6]
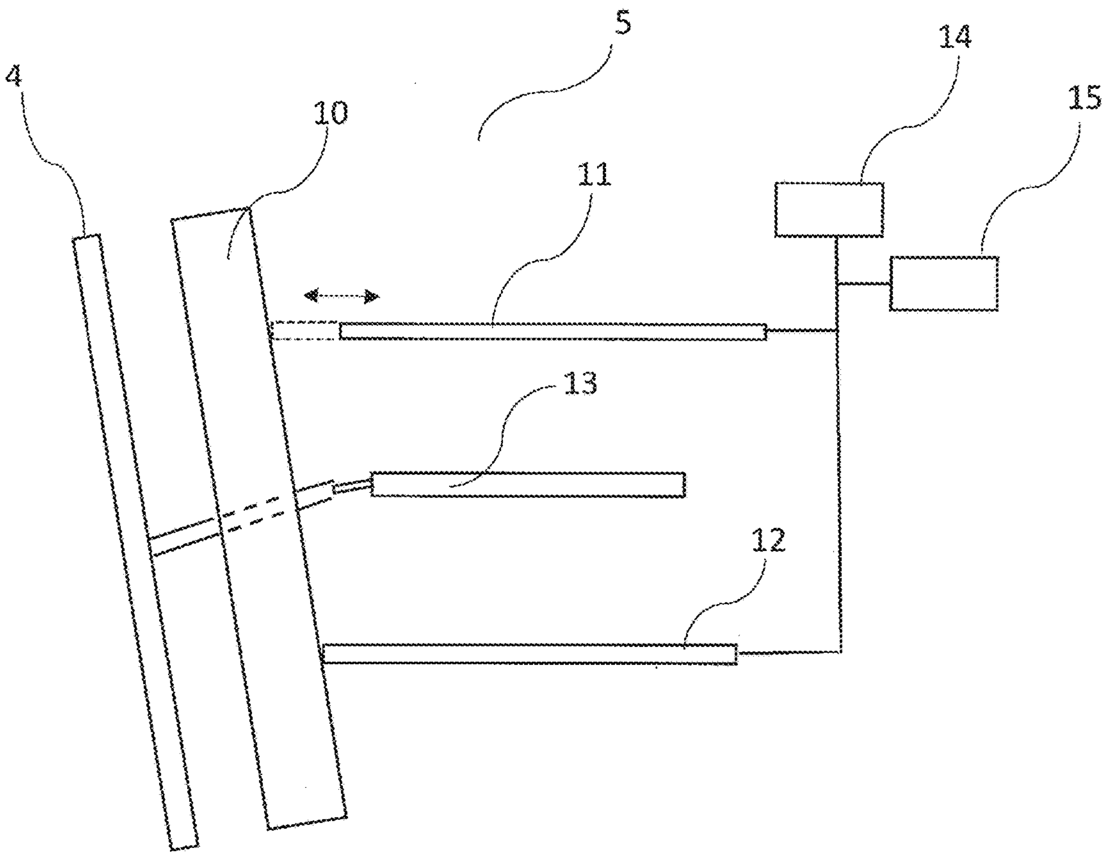

[Fig. 7]
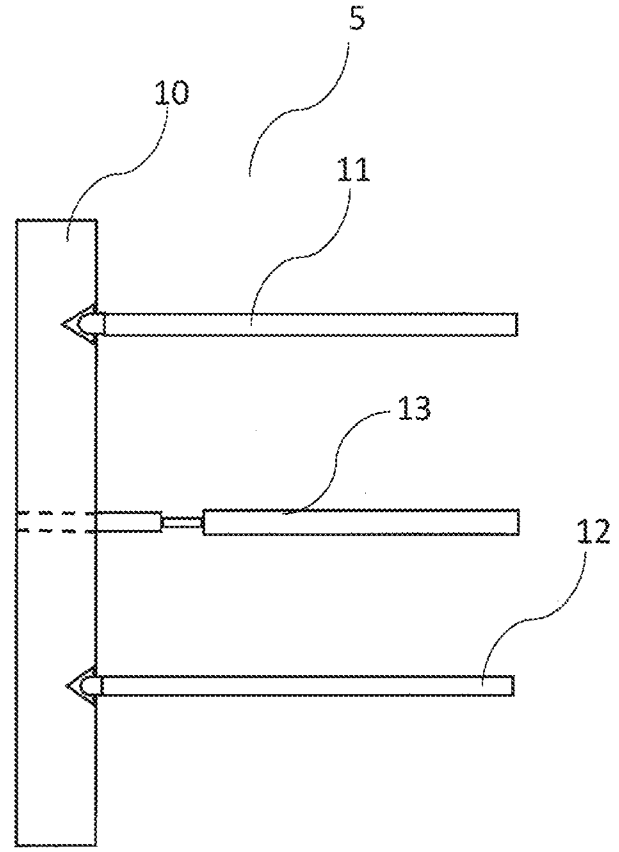

[Fig. 8]
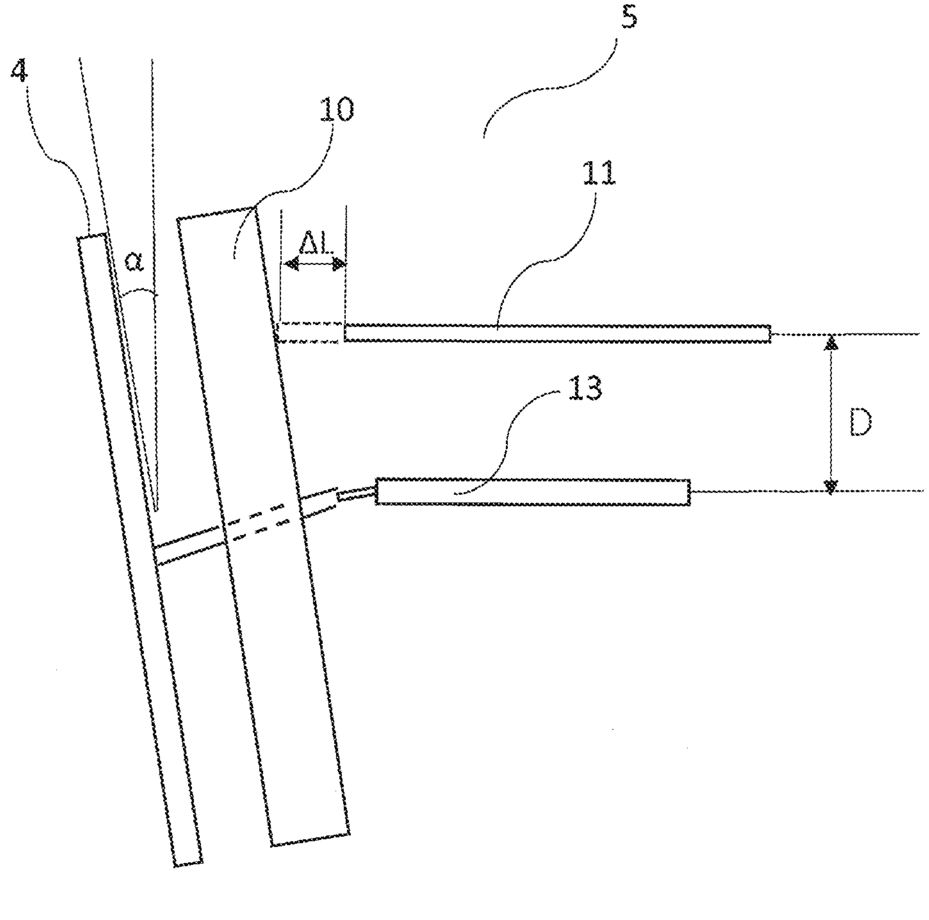

MICROSCOPIC RAMAN SPECTROSCOPIC DEVICE, AND ANGLE ADJUSTING MEMBER FOR OPTICAL ELEMENT

TECHNICAL FIELD

The present invention relates to a micro-Raman spectroscopic device and an angle adjustment member of an optical element used in a spectroscopic device.

BACKGROUND ART

A Raman spectroscopic device can identify a sample by performing spectroscopic analysis on Raman scattered light having different wavelengths generated from the sample when the sample is irradiated with an excitation laser (for example, Patent Document 1).

Particularly, a micro-Raman spectroscopy method has been developed as an analysis method for a chemical structure of a minute portion, and has been widely applied in recent years.

In a micro-Raman spectroscopic device having a confocal optical system, which is one of micro-Raman spectroscopy methods, it is possible to selectively extract only scattered light from a laser-focused position in a sample.

However, while a focused spot diameter that serves as a point light source of a laser is on the order of 1 μm, a focused diameter of a confocal optical system is on the order of tens of μm, so that a micro-Raman spectroscopic device with the confocal optical system requires extremely high optical axis adjustment accuracy. Furthermore, in consideration of the stability of an emission angle of the laser, it is necessary to correct diurnal variations of an incident laser optical axis and a reflected Raman optical axis.

As a method of correcting the optical axis, in the related art, a manual optical axis adjustment method of manually adjusting an optical axis adjustment screw provided in an optical element holder, an electric adjustment method of changing a disposition angle of an optical element by a motor, and the like are known.

PRIOR ART DOCUMENT

Patent Document

Patent Document 1: JP-A-2006-113021

In a case of the method of manually adjusting the optical axis, the adjustment screw is usually installed in a device housing. Therefore, in order to manually adjust the adjustment screw, it is necessary to open the device housing and expose the optical system. However, since the Raman spectroscopic device uses laser light as a light source, it is necessary to open the device housing in a laser controlled area.

In addition, in both the manual optical axis adjustment method and the electric adjustment method, the optical element needs to be adjusted at an angle on the order of 0.001 degrees, requiring a certain level of adjustment skill on the part of an optical axis adjuster, and sometimes imposing a burden on the adjuster to adjust the optical axis.

Furthermore, in a case of the electric adjustment method, it is necessary to select a motor that can be driven with high accuracy and high precision, which may result in a large motor size and high motor cost. As a result, the micro-Raman spectroscopic device itself may be bulky and costly.

SUMMARY OF INVENTION

Problem to be Solved by the Invention

Therefore, there has been a demand for a device that can perform adjustment of an optical axis without opening a device housing and can further perform fine adjustment of the optical axis without imposing an excessive burden on an adjuster.

An object of the present invention is to provide a micro-Raman spectroscopic device capable of performing adjustment of an optical axis without opening a device housing and capable of further performing fine adjustment of the optical axis without imposing an excessive burden on an adjuster.

Another object of the present invention is to provide an angle adjustment member for an optical element, with which fine adjustment of an optical axis can be easily performed.

Means for Solving the Problem

That is, the present invention provides a micro-Raman spectroscopic device including:

- a laser light source;
- a microscope optical unit;
- a plate that fixes a sample;
- a Raman detection system having an optical imaging element for generating a visible image; and
- at least any optical element of an incident light optical element for guiding a laser emitted from the laser light source to the microscope optical unit and a Raman light optical element for guiding a Raman light reflected from the sample to the Raman detection system,
- in which at least one of the incident light optical element and the Raman light optical element has an angle adjustment member including two actuators and a center bar of which a tip portion is movable in 360°.

In addition, the present invention provides an angle adjustment member for an optical element, including: two actuators; and a center bar of which a tip portion is movable in 360°.

Effects of the Invention

According to the present invention, there is provided a micro-Raman spectroscopic device capable of performing adjustment of an optical axis without opening a device housing and capable of further performing fine adjustment of the optical axis without imposing an excessive burden on an adjuster.

Furthermore, according to the present invention, there is provided an angle adjustment member for an optical element, with which fine adjustment of an optical axis can be easily performed.

BRIEF DESCRIPTION OF THE DRAWINGS

FIG. 1 is a schematic view showing an aspect of a micro-Raman spectroscopic device of the present invention, which has an incident light optical element.

FIG. 2 is a schematic view showing another aspect of the micro-Raman spectroscopic device of the present invention, which has the incident light optical element and a Raman light optical element.

FIG. 3 is a schematic view showing an angle adjustment member used in the micro-Raman spectroscopic device of the present invention.

FIG. 4 is a cross-sectional view taken along line A-A in FIG. 3.

FIG. 5 is a schematic view showing an angle adjustment method of the optical element using the angle adjustment member of the present invention.

FIG. 6 is a schematic view showing another preferred aspect of the angle adjustment method of the optical element by the angle adjustment member of the present invention.

FIG. 7 is a schematic view showing one preferred aspect of the angle adjustment member of the present invention.

FIG. 8 is a schematic view showing a displacement angle of an optical element 4.

DESCRIPTION OF EMBODIMENTS

The present invention will be described with reference to FIGS. 1 and 2, but the present invention is not limited to these figures.

FIG. 1 shows an aspect in which one incident light optical element for guiding a laser emitted from a laser light source to a microscope optical unit is provided.

In FIG. 1, light emitted from a laser light source A passes through a focused spot 9 and reaches a microscope optical unit 3 through an incident light optical element 41 and a beam splitter 6. In FIG. 1, arrows indicate a traveling direction of light. In FIG. 1, the incident light optical element 41 has an angle adjustment member 5.

A magnitude of the light emitted from the laser light source A is several μm to several tens of μm, and from the viewpoint of detection sensitivity of Raman light, the wavelength is preferably 532 nm or 785 nm.

The microscope optical unit 3 has a configuration in which an objective lens (not shown) that combines a convex lens and a concave lens is provided, and light incident on the microscope optical unit 3 is focused on a measurement target sample (hereinafter, also referred to as a "sample") fixed on a plate 2 by the objective lens. A magnification of the objective lens is preferably 50 times or more and preferably 100 times or less.

Raman light reflected by the sample is guided to a Raman detection system 8 through a focusing lens 7 and the focused spot 9. The Raman light collected by the focusing lens 7 is focused on the focused spot 9 and is guided to the Raman detection system.

Here, from the viewpoint of resolution, the microscope optical unit 3, with which a confocal optical system in which positions of the light source A, the plate 2, and the focused spot 9 are in a conjugate relationship is implemented, is preferable.

On the other hand, FIG. 2 shows an aspect in which a Raman light optical element 42 for guiding the Raman light reflected from the sample to the Raman detection system is provided in addition to the incident light optical element 41 in FIG. 1.

In FIG. 2, the Raman light transmitted through the beam splitter 6 is guided to the focusing lens 7 by the Raman light optical element 42, passes through the focused spot 9, and is guided to the Raman detection system 8. In FIG. 2, in addition to the incident light optical element 41, the Raman light optical element 42 also has the angle adjustment member 5.

A part of the Raman light guided to the Raman detection system 8 is guided to an optical imaging element (not shown) provided in the Raman detection system 8 as necessary, and a part of the Raman light is guided to a Raman spectrometer (not shown).

Since the optical imaging element generates a visible image of a region on which the Raman light is reflected, a measurement region of the sample for which the Raman light is measured can be confirmed by the optical imaging element.

Examples of the optical imaging element include a charge coupled device (CCD) image sensor, and a complementary metal oxide semiconductor (CMOS) image sensor, and the optical imaging element is configured to be able to capture a still image or a moving image of a sample. The optical imaging element can capture all or at least any of a bright-field image, a dark-field image, a phase-contrast image, a fluorescence image, and a polarizing microscope image of the sample, depending on the configuration of the microscope optical unit 3 or a transillumination (not shown). The optical imaging element outputs the captured image to another information processing device or the like, as necessary.

The Raman spectrometer generates a two-dimensional spectral image of Raman scattered light from the sample and acquires a spectrum of Raman scattering (hereinafter, also referred to as a "Raman spectrum") from the two-dimensional spectral image.

The Raman spectrometer can also obtain the Raman spectrum of the sample by extracting a flat spectrum of a region in the generated two-dimensional spectral image in which there is no object to observe, and then taking a difference between the spectrum and a spectrum of each pixel. The Raman spectrum is usually a plot of an intensity of the emitted light with respect to a wavelength. The emitted light includes scattered light due to Raman scattering, and a wavelength shift (Raman shift) of the scattered light due to Raman scattering varies depending on a molecular structure or a crystal structure of the sample.

The Raman spectrometer outputs the acquired Raman spectrum to a monitor or the like (not shown) and stores the Raman spectrum in a memory storage unit (not shown) as necessary.

The Raman detection system 8 may have the information processing device, the monitor, the memory storage unit, and other necessary components in addition to the optical imaging element and the Raman spectrometer.

In the embodiment schematically shown in FIGS. 1 and 2, since the diameter of the focused spot 9 is about 1 μm on a light source side and is about 30 μm on a Raman detection system side, accuracy of Raman spectroscopic analysis is lowered even in a case of a slight misalignment of an optical axis.

In FIGS. 1 and 2, the angle adjustment member 5 is provided in the incident light optical element 41 and in the Raman light optical element 42 in order to correct the misalignment of the optical axis.

The micro-Raman spectroscopic device 1 of the present invention has at least any one of the incident light optical element or the Raman light optical element. The incident light optical element or the Raman light optical element bends an optical path of the laser light from the light source, enabling a reduction in size of the micro-Raman spectroscopic device.

From the viewpoint of achieving a further reduction in the size of the micro-Raman spectroscopic device, it is preferable to have both the incident light optical element and the Raman light optical element. Although a plurality of incident light optical elements and a plurality of Raman light optical elements may be provided, an excessive number of optical elements increases the misalignment of the optical axis and excessive efforts are required for the adjustment.

Therefore, from the viewpoint of a reduction in size and efforts for adjustment of the optical axis, the number of incident light optical elements and Raman light optical elements may be appropriately set.

The micro-Raman spectroscopic device of the present invention includes the angle adjustment member 5 in at least one of the incident light optical element and the Raman light optical element (hereinafter, both are also collectively referred to as "optical element").

As schematically shown in FIG. 3, the angle adjustment member 5 includes two actuators 11 and 12 and one center bar 13. Although FIG. 3 shows a preferred aspect of the angle adjustment member having an optical element holder 10, the angle adjustment member 5 may not have the optical element holder 10. In a case of having the optical element holder 10, a structure is adopted in which when the optical element holder 10 is displaced as described below, the displacement is transmitted to the optical element 4. In FIG. 3, the optical element holder 10 has a support portion 101 (not shown) that can hold the optical element 4 along a circumference of the optical element holder 10 such that the displacement of the optical element holder 10 is transmitted to the optical element 4. In a case where the optical element holder 10 is not provided, the actuators 11 and 12 and the center bar 13 are disposed to be in direct contact with the optical element 4.

In addition, a structure may be adopted in which the displacement of the optical element holder 10 is transmitted to the optical element 4 via the center bar 13. For example, as shown in FIG. 6, an appropriate gap may be provided between the optical element holder 10 and the optical element 4, and the center bar 13 displaced in response to the displacement of the optical element holder 10 displaces the optical element 4.

FIG. 3 is a view of the angle adjustment member 5 as viewed from an optical element side, and dotted lines indicate that the two actuators 11 and 12 are installed on a rear surface of the optical element holder 10 as viewed from the optical element side.

FIG. 4 is a cross-sectional view taken along line A-A of FIG. 3. The center bar 13 penetrates a substantially center portion of the optical element holder and is in contact with a substantially center portion of the optical element. The substantially center portion does not need to be the exact center portion, and need only be installed at a position where a surface of the optical element 4 is displaced in a three-dimensional space in response to the displacement of the actuators 11 and 12, as described below.

The two actuators 11 and 12 are disposed on a surface of the optical element holder 10 on a side opposite to the optical element 4. In a case where the optical element holder 10 is not provided, the two actuators 11 and 12 are disposed to be in direct contact with a surface of the optical element 4 on a side opposite to a reflecting surface of a laser light.

The actuators 11 and 12 have mechanical or electrical circuits that convert energy or an electrical signal received from the outside into physical motion. As the actuators 11 and 12, for example, an actuator including a piezoelectric element is preferable.

It is preferable that the micro-Raman spectroscopic device of the present invention has an input device 14 that inputs energy or an electrical signal to the actuator and a monitor 15 that can visualize an input value.

The actuators 11 and 12 receive energy or an electrical signal from the outside and are displaced in a direction (arrow direction in FIG. 4) perpendicular to a laser light or Raman light reflecting surface of the optical element 4 (hereinafter, both are also referred to as "reflecting surface"). In a case where the actuators 11 and 12 have the piezoelectric element, lengths thereof are displaced in the direction perpendicular to the reflecting surface of the optical element 4 by a voltage from the outside. In a case of the piezoelectric element, the displacements of the actuators 11 and 12 increase as the voltage from the outside increases.

FIG. 5 schematically shows an aspect in which, in a case where the actuators 11 and 12 have the piezoelectric element, the length of the actuator 11 is displaced in the direction (arrow direction in FIG. 5) perpendicular to the reflecting surface of the optical element 4 by a voltage applied from the outside. A solid line portion of the actuator 11 represents an original state, and a dashed line represents that the length of the actuator 11 is displaced in the direction perpendicular to the laser light reflecting surface of the optical element 4 by the voltage applied from the outside.

The actuator 11 that is displaced in the direction perpendicular to the reflecting surface of the optical element 4 by an applied voltage pushes the optical element holder 10 toward the optical element 4 side (dashed line portion in FIG. 5). On the other hand, since no voltage is applied to the actuator 12, the actuator 12 maintains the original state without the displacement. As a result, an actuator 11 side of the optical element holder 10 in FIG. 5 is displaced to a left side of the paper. The optical element 4 and the optical element holder 10 have a structure in which, in a case where the optical element holder 10 is displaced, the displacement is transmitted to the optical element 4, so that an actuator 11 side of the optical element 4 is also displaced to the left side, and as a result, the optical element 4 is inclined.

On the other hand, the center bar 13 penetrates the optical element holder 10, is in contact with the optical element 4, and has a structure in which a tip portion thereof is movable in 360°. Therefore, as shown in FIG. 5, in a case where the optical element 4 is inclined, the tip portion of the center bar 13 that is in contact with the optical element 4 moves to a lower side of the figure in response to the inclination displacement.

FIGS. 4 and 5 show an aspect in which the optical element 4 is held by the optical element holder 10, but the optical element 4 and the optical element holder 10 need only have a structure in which in a case where the optical element holder 10 is displaced, the displacement of the optical element holder 10 is transmitted to the optical element 4. For example, the two may be connected to each other by a plurality of rigid connecting members, or the optical element holder 10 may have claw portions such that the optical element 4 can be interposed therebetween.

In addition, as shown in FIG. 6, the optical element 4 and the optical element holder 10 may be connected by the center bar 13.

Examples of the structure in which the tip portion of the center bar 13 is movable in 360° include a structure in which the center bar 13 includes a plurality of structural bodies, and the structural bodies are linearly connected by elastic bodies such as rubber and springs, movable connecting members such as bearings, hinges, or the like. The center bar 13 does not need to be adhered to the optical element holder 10, and it is preferable that there is a gap between a penetration portion of the optical element holder 10 penetrated by the center bar 13 and the center bar 13.

In a case where the optical element holder 10 is provided, it is preferable that contact surfaces between the actuators 11 and 12 and the optical element holder 10 are made as less slippery as possible, so that the displacement of the actuators 11 and 12 can be efficiently transmitted to the optical element holder 10.

By increasing a friction coefficient of the contact surfaces between the optical element holder 10 and the actuators 11 and 12, such slipping can be suppressed. Examples of a method of increasing the friction coefficient include a method of roughening a surface and a method of using a material having a large friction coefficient, such as polyolefin and polyvinyl chloride.

In addition, as shown in FIG. 7, a structure may be adopted in which a cutout portion is provided at portions where the actuators 11 and 12 come into contact with the optical element holder 10, and the tip portions of the actuators 11 and 12 that come into contact with the optical element holder 10 are fitted into the cutout portions, so that the slipping may be suppressed. The cutout portion may be provided along the circumference of the optical element holder, or may be provided only in portions with which the actuators 11 and 12 are in contact. A cross-sectional shape of the cutout portion may be triangular, quadrangular, other polygonal shapes, semicircular, semielliptical, or any other shapes. A shape of the tip portions of the actuators 11 and 12 that come into contact with the optical element holder 10 may be triangular, quadrangular, other polygonal shapes, semicircular, semielliptical, or any other shapes.

Installation positions of the two actuators 11 and 12 and the center bar 13 on the optical element holder 10 are not on a straight line. The installation positions of the actuators 11 and 12 and the center bar 13 on the optical element holder are preferably on an installation surface of the optical element holder 10 such that an angle formed by the actuators 11 and 12 (θ in FIG. 3) is 10° to 170° with respect to the center bar 13, preferably 70° to 100°, more preferably approximately 90°, and even more preferably 90°.

In a case where the optical element holder 10 is not provided, a positional relationship between the actuator 11, the center bar 13, and the actuator 12 on the surface of the optical element 4 on the side opposite to the reflecting surface is the above-described relationship. A preferred angle is also the same as that described above.

As described above, the actuators 11 and 12 are displaced in the direction perpendicular to the reflecting surface of the optical element 4 (arrow direction in FIG. 5) by the energy or the electrical signal from the outside. By independently changing the displacements of the actuators 11 and 12, the reflecting surface of the optical element 4 can be adjusted to an arbitrary angle in three dimensions.

In a case where the actuators 11 and 12 have the piezoelectric element, the angle can be adjusted by changing the applied voltage. In addition, in a case where a constant voltage is always applied to the actuators 11 and 12, a displacement of the actuator from a normal position can be changed from a positive displacement to a negative displacement by increasing or decreasing the voltage applied to the actuator. Accordingly, the angle of the reflecting surface of the optical element 4 can be changed significantly.

A cross-sectional shape of the actuators 11 and 12 and the center bar 13 is not particularly limited, and may be triangular, quadrangular, other polygonal shapes, semicircular, semielliptical, or any other shapes. In addition, the cross-sectional shape does not need to be solid, and may be hollow from the viewpoint of a reduction in weight.

In a case where the optical element holder 10 has the angle adjustment member 5, a shape of the optical element holder 10 is not particularly limited, and may be a triangular plate shape, a quadrangular plate shape, other polygonal plate shapes, a circular plate shape, an elliptical plate shape, or any other plate shapes.

As described above, an angle of the reflecting surface of the optical element 4 can be changed by adjusting the energy or the electrical signal applied to the actuators 11 and 12.

Therefore, in a case where there is a misalignment between an optical axis of the laser light incident on the sample and an optical axis of the Raman light reflected from the sample, the misalignment of the optical axis can be corrected by adjusting the energy or electrical signal applied to the actuator 11 or 12 from the input device 14, which inputs energy or electrical signal, while monitoring the energy or electrical signal through the monitor 15 until the misalignment of the optical axis is eliminated.

In a case where the actuators 11 and 12 have the piezoelectric element, the voltage to be applied by the input device 14 may be changed until the misalignment of the optical axis is eliminated.

As shown in FIG. 8, a displacement angle α of the optical element 4 is represented by Formula (1) when it is assumed that the displacement of the actuator 11 or 12 is ΔL, and a distance between the center bar 13 and the actuator 11 or 12 is D.

$$\alpha=\tan^{-1}(\Delta L/D) \quad (1)$$

Therefore, by setting the distance D between the center bar 13 and the actuator 11 or 12 in advance, accuracy of the adjustable angle α can be increased, and extremely small angles can be adjusted.

The distance D between the center bar 13 and the actuator 11 or 12 is a distance between the center portion of the center bar 13 and a center portion of the actuator 11 or 12.

The micro-Raman spectroscopic device of the present invention can perform adjustment of an optical axis without opening a device housing and can further perform fine adjustment of the optical axis without imposing an excessive burden on an adjuster.

Furthermore, by using the angle adjustment member for an optical element of the present invention, a micro-Raman spectroscopic device that can easily perform fine adjustment of the optical axis can be implemented.

Aspects

It is understood by those skilled in the art that the foregoing exemplary embodiments are specific examples of the following aspects.

[1] A micro-Raman spectroscopic device including:
- a laser light source;
- a microscope optical unit;
- a plate that fixes a sample;
- a Raman detection system having an optical imaging element for generating a visible image; and
- at least any optical element of an incident light optical element for guiding a laser emitted from the laser light source to the microscope optical unit and a Raman light optical element for guiding a Raman light reflected from the sample to the Raman detection system,
- in which at least one of the incident light optical element and the Raman light optical element has an angle adjustment member including two actuators that push a back surface of at least one of the incident light optical element and the Raman light optical element to displace at least one of the incident light optical element and the Raman light optical element, and a center bar of which a tip portion is connected to a center portion of at least one of the incident light optical element and the Raman light optical element.

According to the invention of [1], there is provided a micro-Raman spectroscopic device capable of performing adjustment of an optical axis without opening a device housing and capable of further performing fine adjustment of the optical axis without imposing an excessive burden on an adjuster.

[2] The micro-Raman spectroscopic device according to [1], in which a plurality of the incident light optical elements and a plurality of the Raman light optical elements are provided, and at least one of the incident light optical elements and at least one of the Raman light optical elements have the angle adjustment member.

[3] The micro-Raman spectroscopic device according to [1] or [2], in which the microscope optical unit is a confocal optical system.

[4] The micro-Raman spectroscopic device according to any one of [1] to [3], in which the two actuators are attached to the angle adjustment member at an angle of 90° with respect to each other.

[5] The micro-Raman spectroscopic device according to any one of [1] to [4], in which the actuator has a piezoelectric element.

[6] The micro-Raman spectroscopic device according to [5], further including: a device that applies a voltage to the piezoelectric element.

[7] The micro-Raman spectroscopic device according to any one of [1] to [6], in which the optical element having the angle adjustment member further has an optical element holder, and the angle adjustment member is attached to the optical element holder.

[8] The micro-Raman spectroscopic device according to any one of [1] to [7], in which the center bar is connected to at least one of the incident light optical element and the Raman light optical element via an elastic body, a bearing, or a hinge.

According to the inventions of [2] to [8], a micro-Raman spectroscopic device capable of more easily performing adjustment of an optical axis in a miniaturized micro-Raman spectroscopic device is provided.

It is also understood by those skilled in the art that the foregoing exemplary embodiments are specific examples of the following aspects.

[9] An angle adjustment member for an optical element including: two actuators; and a center bar of which a tip portion is movable in 360°.

According to the invention of [9], a micro-Raman spectroscopic device analysis method is provided in which fine adjustment of an optical axis can be easily performed by using the angle adjustment member for an optical element.

[10] The angle adjustment member for an optical element according to [9], in which the two actuators are attached at an angle of 90° with respect to each other.

[11] The angle adjustment member for an optical element according to [9] or [10], in which the actuator has a piezoelectric element.

[12] The angle adjustment member for an optical element according to any one of [9] to [11], further including: an optical element holder.

According to the inventions of to [12], there is provided a micro-Raman spectroscopic device analysis method in which the fine adjustment of the optical axis can be performed more easily.

REFERENCE SIGNS LIST

A: Laser light source
1: Micro-Raman spectroscopic device
2: Plate
3: Microscope optical unit
4: Optical element
41: Incident light optical element
42: Raman light optical element
5: Angle adjustment member
6: Beam splitter
7: Focusing lens
8: Raman detection system
9: Focused spot
10: Optical element holder
101: Optical element holding portion
11, 12: Actuator
13: Center bar
14: Input device that inputs energy or an electrical signal
15: Monitor

The invention claimed is:

1. A micro-Raman spectroscopic device comprising:

a laser light source;

a microscope optical unit;

a plate that fixes a sample;

a Raman detection system having an optical imaging element for generating a visible image; and at least any optical element of an incident light optical element for guiding a laser emitted from the laser light source to the microscope optical unit and a Raman light optical element for guiding a Raman light reflected from the sample to the Raman detection system, wherein at least one of the incident light optical element and the Raman light optical element has an angle adjustment member including two actuators that push a back surface of at least one of the incident light optical element and the Raman light optical element to displace at least one of the incident light optical element and the Raman light optical element, and a center bar of which a tip portion is connected to a center portion of at least one of the incident light optical element and the Raman light optical element, and wherein the center bar is comprised of a plurality of structural bodies, each structural body being connected by a movable member.

2. The micro-Raman spectroscopic device according to claim 1, wherein a plurality of the incident light optical elements and a plurality of the Raman light optical elements are provided, and at least one of the incident light optical elements and at least one of the Raman light optical elements have the angle adjustment member.

3. The micro-Raman spectroscopic device according to claim 1, wherein the microscope optical unit is a confocal optical system.

4. The micro-Raman spectroscopic device according to claim 1, wherein the two actuators are arranged so that lines extending from a tip portion on an optical element side of the center bar to respective tip portions on the optical element side of the two actuators form an angle of 90° with respect to each other.

5. The micro-Raman spectroscopic device according to claim 1, wherein the actuator has a piezoelectric element.

6. The micro-Raman spectroscopic device according to claim 5, further comprising:

a device that applies a voltage to the piezoelectric element.

7. The micro-Raman spectroscopic device according to claim 1, wherein the angle adjustment member has an optical element holder.

8. An angle adjustment member for an optical element comprising:

two actuators; and a center bar connected to a center portion of the optical element, wherein the center bar is comprised of a plurality of structural bodies, each structural body being connected by a movable member.

9. The angle adjustment member for an optical element according to claim 8, wherein the two actuators are arranged so that lines extending from a tip portion on an optical element side of the center bar to respective tip portions on the optical element side of the two actuators form an angle of 90° with respect to each other.

10. The angle adjustment member for an optical element according to claim 8, wherein the actuator has a piezoelectric element.

11. The angle adjustment member for an optical element according to claim 8, further comprising:

an optical element holder.

12. The micro-Raman spectroscopic device according to claim 1, wherein the movable member is an elastic body, a movable connecting member, or a hinge.

* * * * *